Feb. 16, 1926.  A. C. HAUCK  1,573,705
EDGING GAUGE
Filed July 10, 1923
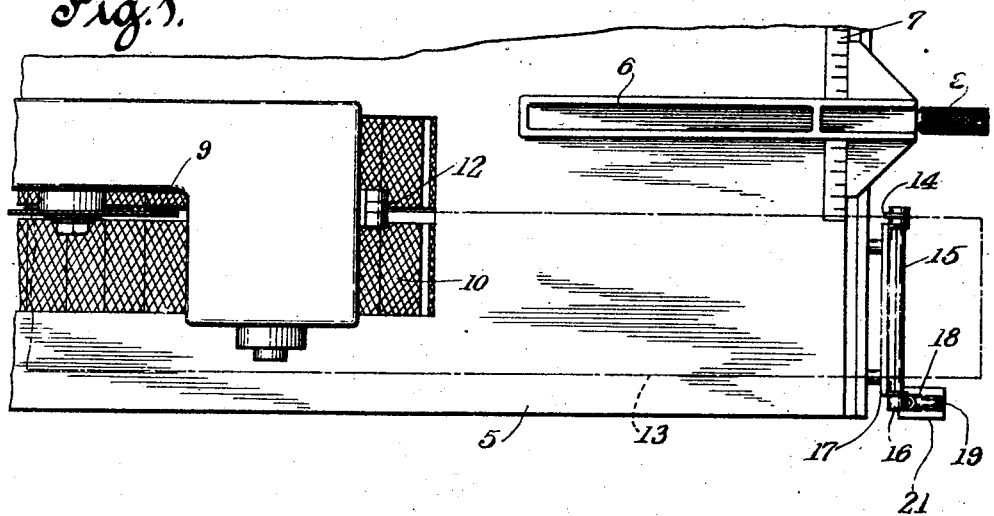
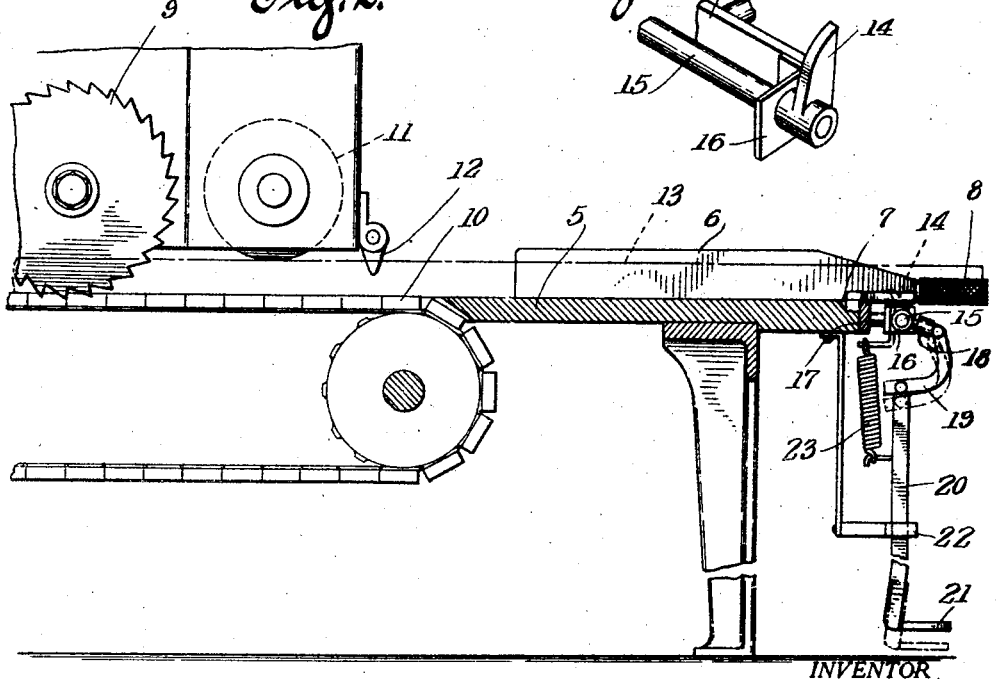 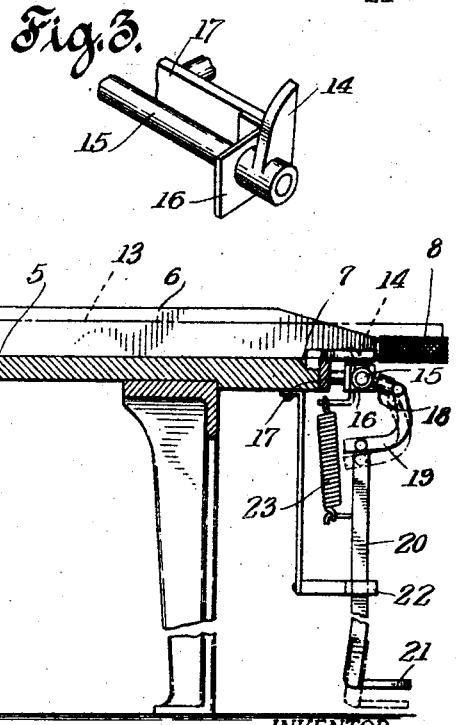
INVENTOR
Andrew C. Hauck
BY
Philip S. McLean.
ATTORNEY Patented Feb. 16, 1926.

1,573,705

UNITED STATES PATENT OFFICE.

ANDREW C. HAUCK, OF BROOKLYN, NEW YORK, ASSIGNOR TO WILLIAMSBURG WOOD HEEL COMPANY, OF BROOKLYN, NEW YORK, A CORPORATION OF NEW YORK.

EDGING GAUGE.

Application filed July 10, 1923. Serial No. 650,595.

*To all whom it may concern:*

Be it known that I, ANDREW C. HAUCK, a citizen of the United States, and a resident of Brooklyn, Kings County, and State of New York, have invented certain new and useful Improvements in Edging Gauges, of which the following is a specification.

The present invention relates to woodworking machinery and some of the more important objects are to provide simple and practical means for enabling rapid and accurate edging of the work.

The foregoing and other objects are attained through the instrumentality of certain novel features of construction, combination and relation of parts, a commercial example of which is illustrated in the accompanying drawing, wherein:

Figure 1 is a broken plan view of the feed table end of a sawing machine to which the invention is applied.

Figure 2 is a vertical sectional view of the same.

Figure 3 is a detached fragmentary view of the disappearing edging gauge.

The feed table 5 of the machine illustrated is equipped with the usual adjustable side gauge 6 cooperating with a scale 7 and secured in its adjusted relation by a clamp screw 8. The saw is indicated at 9 and the means for feeding the work thereto consist of the endless chains 10 which in combination with the overhead pressure roller 11, grip the boards and advance them in a straight line.

The boards as they come to this mill usually have rough edges, one of which should be evened off to serve as a straight-edge for the subsequent ripping operations. Heretofore, these mills sometimes have been provided with a free swinging gauge 12 located on the line 13 of the saw-cut adjacent the point where the work is gripped by the feed conveyors, which would serve as a gauge for the forward end of the board, but this gauge does not prevent the work from being fed in at an angle and hence being cut more or less on the bias. To gauge the rear edge of the work I have provided at 14 a gauge finger disposed on the line of the saw-cut and which while normally supported below the plane of the saw table can be projected up so as to stand in the path of feeding-in movement of the board. In the present illustration this disappearing gauge finger is carried by a shaft 15 pivoted in bearings 16 carried by a bracket 17 secured to the end of the feed table.

In order that the gauge finger shall be under the control of the operator, I have shown the shaft as having a rock arm 18 connected by a pivoted link 19 with a pull rod 20 having a pedal 21 at the lower end thereof. The pedal rod is shown as slidingly guided in a bearing 22 and as yieldingly held in elevated position by a spring 23, which spring, it will be seen, serves as a means for rocking the shaft in a direction to lower the gauge finger below the plane of the table top.

With this invention, when a board is to be edged, the operator simply steps on the pedal so as to throw the gauge up into operative position and resting the edge of the board against the forward and rearward edge gauges, slides the board forwardly into the grip of the feed mechanism. As soon as the feed takes hold, pressure on the pedal is released so as to permit the rear gauge to drop down so that it will not interfere with the straight feed of the work. This disappearing feature is important because the rough edge of the board frequently has protuberances which, if the gauge remained in position, would have a tendency to twist the board as it feeds in to the cutter.

It will be noted that the disappearing rear edge guide lowers while traveling forwardly in the direction of the feed so that the tendency of the feeding-in action is to automatically lower this gauge. This prevents injury or breakage of parts in case the pressure on the pedal is not released immediately as soon as the feed mechanism takes hold.

The invention, it will be seen, is readily attachable to machines now in use and provides a simple and practical means for accurately edging the work preparatory to the actual sawing or ripping operations. As soon as the work is edged in the manner described, the sawing may be continued. The side gauge may then be brought into use by feeding the work in with its newly finished edge against the face of the side gauge. The side gauge may thus be set for a desired width or cut and not be disturbed during the preliminary edging operations.

What I claim is:

1. The combination with a saw and means for feeding the work in a straight line past said saw, of a front edge gauge positioned substantially on the line of the saw cut and located closely adjacent the automatic feeding means and an automatically disappearing gauge for preliminarily positioning the rear edge of the work, said rear edge gauge being located at a point removed from the feeding means and provided both with means for automatically retracting the same out of the plane of the work and with means for momentarily projecting the same into gauging position, whereby upon the operation of said mechanism, a board to be edged may be positioned at both ends against said gauges before entering the grip of the feeding means and on release of said projecting mechanism, the rear edge gauge will automatically retract out of the path of the board so as not to interfere with the straight passage of the board in the grip of the feeding means.

2. In woodworking machinery, the combination with a cutter, a feed table and means for feeding the work over the table past the cutter, of a rock shaft journaled horizontally clear of the end of the table, a gauge finger on one end of said rock shaft, spring means operating to rotate the rock shaft in a direction to lower said gauge finger below the level of the table top and means for freely rotating the rock shaft in the opposite direction, operable to hold said shaft with the gauge finger projected above the table only so long as external force is applied thereto and the spring being operable to rotate the shaft and retract the gauge finger as soon as the external force is removed, whereby said gauge finger may be quickly projected by the application of such force and will disappear of itself automatically upon the removal of such force.

3. As an article of manufacture, a rear edge gauge attachment for saw tables comprising a support attachable to the end of a saw table, an edge gauge retractably mounted in said support, spring means acting on said gauge to normally lower the same in the support below the level of the table top and a pedal suspended from the support and operable on the application of foot pressure to project the gauge against the force of the spring so that said gauge will be projected into gauging position only when and for so long as pressure is applied to the foot pedal.

In witness whereof, I have hereunto set my hand this 26th day of June, 1923.

ANDREW C. HAUCK.